United States Patent [19]

Jackovitz et al.

[11] Patent Number: 4,639,401

[45] Date of Patent: Jan. 27, 1987

[54] SURFACTANT ADDITION TO PHOSPHORIC ACID ELECTROLYTE

[75] Inventors: John F. Jackovitz, Monroeville; Richard P. Kunkle, Irwin, both of Pa.

[73] Assignee: The United States of America as represented by the United States Department of Energy, Washington, D.C.

[21] Appl. No.: 832,785

[22] Filed: Feb. 26, 1986

[51] Int. Cl.$^4$ .............................................. H01M 8/10
[52] U.S. Cl. ........................................ 429/30; 429/46
[58] Field of Search ................. 429/46, 101, 198, 203, 429/30

[56] References Cited

U.S. PATENT DOCUMENTS

| | | | |
|---|---|---|---|
| 3,379,573 | 4/1968 | Gershberg | 429/46 |
| 3,403,055 | 9/1968 | Weiss et al. | 429/13 |
| 4,493,879 | 1/1985 | Kahara et al. | 429/46 |

FOREIGN PATENT DOCUMENTS

| | | | |
|---|---|---|---|
| 0074111 | 3/1983 | European Pat. Off. | 429/46 |
| 1302093 | 7/1962 | France | 429/46 |

OTHER PUBLICATIONS

Chemical Abstracts, v. 104, No. 2, Jan. 1986, abstract #8306r, Segawa, Noboru, "Fuel Cell".

*Primary Examiner*—Donald L. Walton
*Assistant Examiner*—Steven P. Marquis
*Attorney, Agent, or Firm*—Judson R. Hightower; Richard E. Constant

[57] ABSTRACT

A phosphoric acid fuel cell having an improved electrolyte comprising concentrated $H_3PO_4$ and at least 0.5 wt. percent lauryl dimethyl amine.

4 Claims, No Drawings

SURFACTANT ADDITION TO PHOSPHORIC ACID ELECTROLYTE

BACKGROUND OF THE INVENTION

This invention is directed to improved electrochemical fuel cells. In particular, the present invention is directed to an improved phosphoric acid electrolyte used in electrochemical fuel cells. The United States Government has rights in this invention pursuant to Contract No. DEN-3-290 between the U. S. Department of Energy and Westinghouse Electric Corporation.

The term "fuel cell" is used in the art to denote a device, system or apparatus wherein chemical energy of a fluid combustible fuel, for example, hydrogen, carbon monoxide, or a hydrocarbon, is electrochemically converted to electrical energy to a non-sacrificial or inert electrode. The true fuel cell is adapted for continuous operation and is supplied with both fuel and oxidant from sources outside the cell proper. Such cells include at least two non-sacrificial or inert electrodes, functioning as anodes and cathodes, respectively, which are separated by an electrolyte which provides ionic conductants therebetween, conduction means for electrical connection between such anode and cathode external to said electrolyte, means for admitting a fluid fuel into dual contact with the anode and electrolyte and means for emitting a fluid oxidant into dual contact with the cathode and electrolyte. Where necessary or desired, the electrolyte compartment is divided into an anolyte compartment and a catholyte compartment by an ion-permeable partition or ion-exchange membrane. Thus, in each cell, a fluid fuel is passed to the anode and there oxidized electrochemically, giving up electrons to the anode, while a fluid oxidant is passed to the cathode and there reduced upon receiving electrons upon such cathode. Since the voltage developed by individual cell is low, it is usually preferable to employ relatively small cells to electrically connect large numbers of such cells in series or in both series and parallel.

Phosphoric acid fuel cells are known in the industry. Concentrated phosphoric acid has been used as an electrolyte for these types of fuel cells. However, concentrated phosphoric acid has very limited wetting properties and requires tediously long periods to permeate the electrodes after the cell is filled. In addition, the wetting ability of the concentrated phosphoric acid does not improve appreciably with increasing temperatures up to 190° C. so that heating the cell does not decrease electrode wetting time. Many approaches have been attempted in resolving the wetting problem associated with concentrated phosphoric acid as electrolyte. Initial approaches to increase the wetting properties of concentrated phosphoric acid have used selected surfactants. These surfactants should be insoluable in the acid and should not adversely affect cell performance. In addition, these surfactants should produce the desired effect at very low concentrations (for example, less than 1%).

Common anionic surface active agents such as sodium or ammonium lauryl sulfate do not dissolve in concentrated phosphoric acid and are thus excluded from further consideration. An ammonium surfactants, such as lauryl dimethyl ammonium chloride, have sufficient solubility concentrated phosphoric acid but introduce a foreign anion into the system which may have adverse long term effects. Non-ionic surfactants, such as ethoxylated fatty alcohol, are also candidates from both the solubility and purity standpoints. These are normally liquids that dissolve readily in viscous phosphoric acid. However, the non-ionic materials tend to decompose and produce electrolyte darkening near 100° C. Clearly, the selection of a surfactant which will increase the wetting properties of the concentrated phosphoric acid without affecting the resulting properties of the fuel cell remains a problem in the art. Applicants have discovered a suitable and economical solution to the wetting properties of the phosphoric acid electrolyte.

SUMMARY OF THE INVENTION

It is the primary object of the present invention to provide a novel electrolyte for use in concentrated phosphoric acid fuel cells.

It is a further object of the present invention to provide a novel fuel cell comprising a phosphoric acid electrolyte having improved wetting properties.

Additional objects, advantages and novel features of the invention will be set forth in part in the description which follows, and in part will become apparent to those skilled in the art upon examination of the following or may be learned by practice of the invention. The objects and advantages of the invention may be realized and obtained by means of the instrumentalities in combinations particularly pointed out in the appended claims.

To achieve the foregoing and other objects and in accordance with the purpose of the present invention as embodied and broadly described herein, the improved electrolyte of the present invention comprises concentrated phosphoric acid and at least about 0.5 wt. percent of an amine capable of reacting in situ with the phosphoric acid to produce an ammonium phosphate.

In a preferred embodiment of the present invention, the amine consists of lauryl dimethyl amine.

In another aspect, the present invention comprises a novel fuel cell comprising a container having disposed therein a cathode, an anode, and a divider positioned between said cathode and the anode. The divider separates the cathode and anode from one another. An electrolyte comprising concentrated phosphoric acid and at least 0.5 wt. percent of an amine capable of reacting in situ with the phosphoric acid to produce an ammonium phosphate is placed in the container.

In a preferred embodiment of this aspect of the present invention, the amine consists of lauryl dimethyl amine.

The novel electrolyte of the present invention reduces dramatically the interfacial tension of the electrolyte thereby increasing the ability of the electrolyte to wet the electrodes in the fuel cell. The addition of the lauryl dimethyl amine to the electrolyte allows for in situ generation of an ammonium phosphate producing the desired effect of lowering the interfacial tension of the electrolyte allowing for improved wetting characteristics for the phosphoric acid electrolyte. The use of the lauryl dimethyl amine which enables in situ generation of the surfactant solves the problem of introduction of a foreign anion into the system and produces an additive which is stable over the operating temperatures of the fuel cell (e.g., 25°–190° C.). Eventually, the surfactant will decompose releasing carbon dioxide. However, carbon dioxide is not an impurity which hampers the operation or characteristics of the fuel cell. Thus, the addition of lauryl dimethyl amine will result in an electrolyte possessing the desired wetting properties without any increase in impurity production.

DETAILED DESCRIPTION OF THE INVENTION

Reference will now be made in detail to the present preferred embodiment of the invention.

To illustrate the improved results of the novel electrolyte of the present invention, the following example is set forth below.

EXAMPLE

Lauryl dimethyl amine (LDA) is added to concentrated phosphoric acid producing a salt according to the following equation:

$$LDA + H_3PO_4 > (LDA\ H^+)H_2PO_4^-$$

The lauryl dimethyl amine is rapidly blended with the phosphoric acid producing a final solution which is colorless. The interfacial tension measurements of the solution were made using a DuNuoy ring type tensiometer. A 6.0 centimeter ring was sufficient for all measurements. Since the concerns were to observe large changes, no critical control of temperature or careful calibration of the instrument before each measurement was performed. The intertension values reported in Table I below are plus or minus 3% accurate which is sufficient to demonstrate the desired improved results of the present invention.

TABLE 1

DuNuoy Interfacial Tension Measurements of Some Phosphoric Acid-Surfactant Blends from 25-190° C. An $N_2$ Blanket Covered the Samples During the Measurements

| T, °C. | 97% $H_3PO_4$, dyne/cm | 97% $H_3PO_4$ + 0.5% LDA, dyne/cm | 97% $H_3PO_4$ + 0.5% Triton, dyne/cm | 48.5% $H_3PO_4$, dyne/cm |
|---|---|---|---|---|
| 25 | 79 | 47 | 49 | 82 |
| 50 | 78 | 46 | 44 | 83 |
| 75 | 79 | 45 | 43 | 83 |
| 100 | 78 | 40 | 65* | — |
| 150 | 80 | 34 | 45 | — |
| 190 | 80 | 25 | 50 | — |

*Decomposition and darkening occurred.

The interfacial tension dropped dramatically (from 79 dyne/cm for the 97% concentrated acid) to 47 dyne/cm for the acid treated with lauryl dimethyl amine. The treated sample also showed interfacial tension decrease to 25 dyne/cm as the temperature reached 190° C. After standing one week, lauryl dimethyl amine treated sample gave identical interfacial tension values as shown in Table 1, above. This indicates that the generated salt was stable in the concentrated acid.

Addition of a non-ionic surfactant to the concentrated acid also produces a decrease in interfacial tension (see Table 1 above). The surfactant chosen, Triton X-100, is a polyethoxylated lauryl alcohol which has moderate solubilities and concentrated phosphoric acid. The interfacial tensions reported in Table 1 for 97% phosphoric acid plus 0.5 wt. percent Triton X-100 are set forth in Table 1. However, this material decomposed at elevated temperatures.

The interfacial tension may be adjusted to a desired or optimal value by varying the amount of lauryl dimethyl amine or Triton in the concentrated acid. However, amounts greater than 1% do not produce an interfacial tension decrease beyond that observed for 0.5% addition. In addition, in Table 1, values for a 1:1 dilution of the parent acid (phosphoric acid with deionized water) are set forth. It is observed that the diluted acid has a higher interfacial tension than the concentrate, indicating that water pickup actually reduces the wetting power of the phosphoric acid and thus increases the electrode wetting time.

In conclusion, results set forth in Table 1, demonstrate that the in situ generated ammonium phosphate produce by the addition of lauryl dimethyl amine to the concentrated phosphoric acid electrolyte produces the desired results of decreasing wetting time without any attendant decomposition of the surfactant. Thus, the wetting properties of the surfactant would be obtained when needed and the impurities which could enter the electrolyte system would be kept at a minimum.

The foregoing description of the preferred embodiment of the present invention has been presented for purposes of illustration and description. It is not intended to be exhaustive or to limit the invention to the precise form disclosed. And obviously, many modifications and variations are possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the scope of the invention be defined by claims appended hereto.

We claim:

1. A fuel cell comprising a container having disposed therein: a cathode, an anode, a divider positioned between said cathode and anode to separate said cathode and anode one from the other and an electrolyte comprising $H_3PO_4$ and at least about 0.5 wt. percent of an amine capable of reacting with said $H_3PO_4$ in situ to produce an ammonium phosphate thereby reducing interfacial tension and increasing the wetting properties of said $H_3PO_4$.

2. The fuel cell of claim 1 wherein said amine is lauryl dimethyl amine.

3. An electrolyte for use in fuel cells comprising concentrated $H_3PO_4$ and at least about 0.5 wt. percent of an amine capable of reacting with said $H_3PO_4$ in situ to produce an ammonium phosphate.

4. The electrolyte of claim 3 wherein said amine is lauryl dimethyl amine.

* * * * *